US007606699B2

(12) United States Patent
Sundararajan et al.

(10) Patent No.: US 7,606,699 B2
(45) Date of Patent: Oct. 20, 2009

(54) MODELING OF FORECASTING AND PRODUCTION PLANNING DATA

(75) Inventors: Ramaswamy Sundararajan, Cupertino, CA (US); Erik Anson Lindquist, San Mateo, CA (US); Nardo B. Catahan, Jr., South San Francisco, CA (US); Shailendra Garg, Sunnyvale, CA (US); Maria Theresa Barnes Leon, Fremont, CA (US)

(73) Assignee: Siebel Systems Inc., San Mateo, CA (US)

( * ) Notice: Subject to any disclaimer, the term of this patent is extended or adjusted under 35 U.S.C. 154(b) by 444 days.

(21) Appl. No.: 10/397,681

(22) Filed: Mar. 25, 2003

(65) Prior Publication Data

US 2007/0225949 A1    Sep. 27, 2007

(51) Int. Cl.
G06F 9/445 (2006.01)
G06Q 10/00 (2006.01)
(52) U.S. Cl. .............................. 703/26; 705/10; 705/26
(58) Field of Classification Search .................... 703/2, 703/22, 26; 702/2; 705/7, 35, 8, 9, 10, 26
See application file for complete search history.

(56) References Cited

U.S. PATENT DOCUMENTS

| 5,461,699 | A | * | 10/1995 | Arbabi et al. ................. 706/21 |
| 5,890,158 | A | | 3/1999 | House et al. |
| 5,991,732 | A | * | 11/1999 | Moslares ....................... 705/8 |
| 6,151,582 | A | * | 11/2000 | Huang et al. ................... 705/8 |
| 7,082,401 | B2 | * | 7/2006 | Behrens et al. ................ 705/7 |
| 7,260,550 | B1 | * | 8/2007 | Notani ......................... 705/10 |
| 2002/0069020 | A1 | * | 6/2002 | Burfeind et al. ............... 702/2 |
| 2002/0111889 | A1 | * | 8/2002 | Buxton et al. ................ 705/35 |
| 2002/0129145 | A1 | * | 9/2002 | Chow .......................... 709/225 |
| 2002/0161624 | A1 | * | 10/2002 | Bradlee ....................... 705/10 |
| 2002/0169657 | A1 | * | 11/2002 | Singh et al. .................. 705/10 |
| 2002/0178077 | A1 | * | 11/2002 | Katz et al. .................... 705/26 |
| 2003/0033179 | A1 | * | 2/2003 | Katz et al. .................... 705/7 |
| 2003/0158765 | A1 | * | 8/2003 | Ngi et al. ....................... 705/7 |
| 2004/0068430 | A1 | * | 4/2004 | Peachey-Kountz et al. .... 705/10 |
| 2007/0265904 | A1 | * | 11/2007 | Lindquist et al. ............. 705/10 |

* cited by examiner

Primary Examiner—Thai Phan
(74) Attorney, Agent, or Firm—Campbell Stephenson LLP

(57) ABSTRACT

A forecast class is defined that represents forecasts of different types and identifies relationships of a forecast with various entities related to the forecast.

38 Claims, 17 Drawing Sheets

US 7,606,699 B2

MODELING OF FORECASTING AND PRODUCTION PLANNING DATA

FIELD OF THE INVENTION

This invention relates generally to data modeling, and more particularly to modeling of forecasting and production planning data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Siebel Systems, Inc., All Rights Reserved.

BACKGROUND OF THE INVENTION

Forecasts are the foundation of every company's business plans. Accurate forecasts enable a company to maintain appropriate staffing levels, set realistic sales targets, create effective marketing promotion mixes, build budgets that match operating expenses, and keep inventory at the right level to meet, but not exceed, customer demand.

Accurate forecasting must involve a range of activities across different departments within an organization and/or different organizations. For example, in a manufacturing company, the forecasting process may require collaboration among its manufacturing, sales and marketing departments, as well as outside companies such as raw material suppliers, wholesalers, etc. Typically, the approaches to forecasting may vary significantly from company-to-company and division-to-division. While forecasting may only involve a simple query in some companies or divisions, it can be an extensive planning process in other companies or divisions. Forecasting may be very high level in some organizations, and very detailed in other organizations. As a result, forecast data models maintained by different companies and divisions typically support varying levels of detail of the forecast data being stored.

Further, individual companies usually store forecast data in their own unique way. For example, a raw material supplier may organize forecast data in a way that is very different from the way that a manufacturing company may organize forecast data. Even within a single manufacturing company, that company may use many different application programs that employ very different schemas and data models. For example, a demand forecasting program may use a data model that is very different from the data model used by a supply forecasting program. The use of customized data models by a company and by internal applications has the advantage that it allows information to be modeled in a way that is appropriate for the business needs of the company.

Unfortunately, because of this diversity in the data models, it is not easy for the company to share its information with other companies or for internal applications to share their information.

Various attempts have been made to define standard data models so that information can be more easily shared between different organizations and applications to allow the consolidation of their disparate forecast processes into a single, comprehensive forecast. However, these data models have not been able to achieve sufficient data integration and simplicity. As a result, existing forecasts are typically inaccurate, ineffectual and difficult to verify.

SUMMARY OF THE INVENTION

The present invention relates to various aspects for modeling forecast data.

According to one aspect of the present invention, a forecast class is defined that represents forecasts of different types and identifies relationships of a forecast with various entities related to the forecast.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
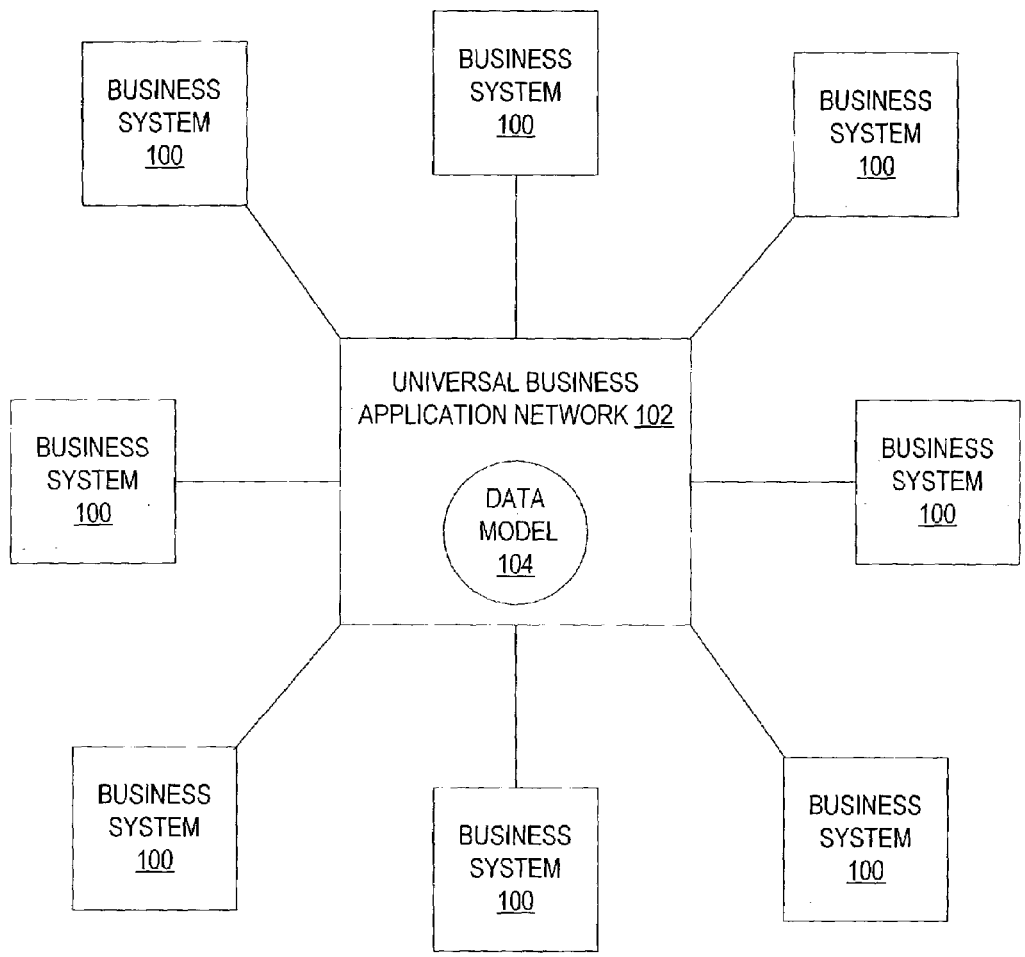
FIG. 1 is a block diagram illustrating the interconnection between various business systems and a universal business application network, according to one embodiment of the present invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

A data model that provides a common data structure to represent a forecast and allows for customization of the data model in a manner that facilitates upgrading of the data model is described. The term "forecast" refers to various forecasting and planning processes within an organization or across several collaborating organizations. The information that is used in these processes or is generated during these processes is referred to herein as forecast data. The forecasting and planning processes may include, for example, demand forecasting, revenue forecasting, unit forecasting, sales volume planning, production planning, budget planning, etc.

In one embodiment, the data model defines a forecast class that represents forecasts of different types. The different types may include, for example, a demand forecast type and a supply forecast type. A demand forecast may be created by a sales division to predict the demand for a particular product or service and the resulting revenue. A supply forecast may be created by a production division to predict inventory requirements. The sales and production divisions may be parts of the same organization or different organizations. In one embodiment, the forecast class includes a designated data element to store data that indicates whether the elements of the forecast class store data of a specific forecast type (e.g., a demand forecast type or a supply forecast type).

In one embodiment, the forecast data model defines relationships of a forecast with various entities related to the forecast. These entities may include, for example, a related business unit (an organization for which the forecast is created), a forecast planner (an entity creating the forecast), a related product line (a product line or service for which the forecast is created), a related product (a product or service for which the forecast is created), a related account (an organization providing the product or service for which the forecast is created), and a related sales representative (a sales representative of the product or service for which the forecast is created).

In one embodiment, the forecast data model also defines relationships with demand sources for forecasts of the demand type. A demand source may be a business opportunity (e.g., a deal to sell a specific product) or a service request (e.g., a request to provide a specific service).

In one embodiment, the forecast data model associates the forecast with fact data. The fact data may include, for example, the number of units, the unit of measure, the unit price of the product or service for which the forecast is created, the total cost of the product or service for which the forecast is created, the total revenue that is expected to be generated by the product or service, the best case estimate of the revenue, and the worst case estimate of the revenue.

The data model models the relationships as attributes associated with forecast. In one embodiment, the forecast data model is specified using a schema language such as XML Schema.

Based on the relationships defined by the forecast data model, a revenue forecast may be reported by account, product line, product, opportunity, service request, forecast planner, or organization.

In one embodiment, the data model defines a hierarchy of the data elements for describing a forecast. The data model may define data elements that are complex. A complex data element is a data element that comprises data sub-elements. For example, an address data element may be a complex data element that includes street, city, and state data sub-elements. The data model may specify custom data elements at various places within the hierarchy of data elements. A custom data element is of a custom data element type. The custom data element type initially defines no data elements. The data model can be customized by defining custom data elements that are specific to different applications or systems. Because the custom data elements are defined at various places within the hierarchy, the customizations of the data model can be associated with related data elements within the hierarchy.

Thus, the forecast data model provides a common data structure for interfacing forecast data of various divisions within an organization and/or forecast data of an organization and collaborating third parties, while allowing for simplified customization of this data structure by individual companies in accordance with their needs. Hence, the forecast data model allows companies to maintain, support and upgrade only a single data model and facilitates efficient data transformations and mappings.

FIG. 1 is a block diagram illustrating the interconnection between various business systems 100 (business systems utilizing forecast related data) and a universal business application network 102, according to one embodiment of the present invention. The universal business application network 100 serves as an integration hub for the business systems 100. The architecture of the universal business application network 102 allows new applications (e.g., new forecast applications) that access legacy business systems to be developed with minimum customization. The legacy business systems can be provided by a single business organization or by different business organizations. The universal business application network 102 allows the forecast applications to exchange information using a forecast data model 104.

In one embodiment, the forecast data model 104 defines a hierarchical data structure representing a forecast. This hierarchical data structure includes data elements that are common to all business systems 100. In addition, the hierarchical data structure includes data custom data elements at various levels of the hierarchy to define data fields that are specific to each business system 100, thus providing for easy customization of the forecast data model 104.

In one embodiment, the universal business application network 102 uses the XML and Web services standards.

Figure 2:
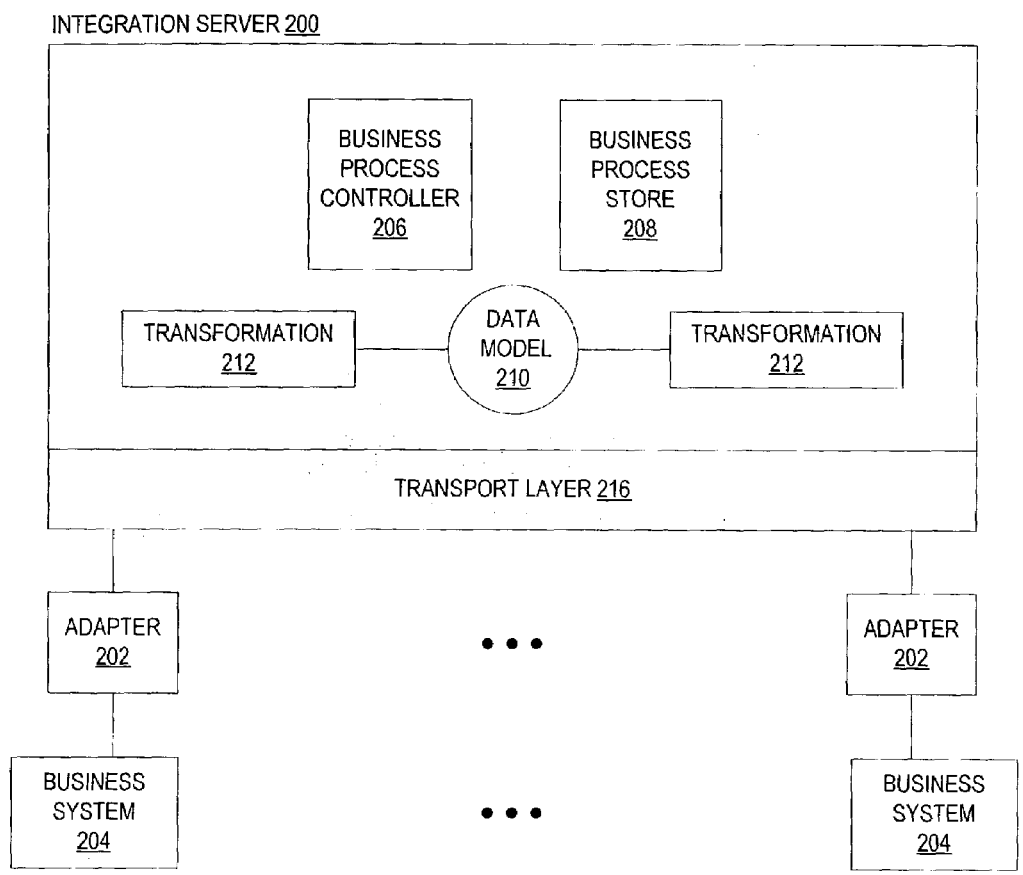
FIG. 2 is a block diagram illustrating the overall architecture of a universal business application network, according to one embodiment of the present invention.

FIG. 2 is a block diagram illustrating the overall architecture of a universal business application network in one embodiment. The hub of the universal business application network is an integration server 200 that connects to the various business systems 204 (e.g., business systems utilizing forecast related data) via adapters 202. The integration server 200 includes a transport layer 216, a data model 210, a transformation store 214, a business process controller 206, and a business process store 208.

The transport layer 216 is a mechanism through which business information is exchanged between the business systems 204 and the business integration server 200. Each business system 204 may have an adapter 202 that is appropriate to the protocol of the transport layer. For example, the transport mechanism may use communications protocols such as TCP/IP. The transport layer 216 may provide a messaging service for queuing, for guaranteeing delivery of messages, and for handling both synchronous and asynchronous messaging. The adapters 202 relay events from the business systems 204 to the integration server 200 and can import configurations of the business systems 204 into the integration server 200. In addition, the universal business application network may include encryption and authentication mechanisms to ensure the security and integrity of the information. For example, authentication will help ensure that a business process is accessing the intended business system, rather than an impostor business system.

The integration server 200 stores the representation of a data model 210 (e.g., in an XML schema file) that contains the definition of a forecast class. The forecast class represents forecasts of different types (e.g., demand forecasts and supply forecasts) and defines relationships of a forecast with various related entities.

The transformation store 212 contains a model data definition tool (e.g., an XML schema definition tool) to create a definition of the data model 210 (e.g., in an XML schema file) and to customize the data model 210 when requested by adding custom data fields to the data model 210. The transformation store 212 also contains transformations for transforming information received from the business systems 204 to the format used by the data model 210, and vice versa. The transformations may be specified as a computer program, an XML Stylesheet Language Transform (XSLT), etc.

The business process store 208 contains the business processes that have been defined. A business process may be specified as a script, a process flow, an executable program, etc. In one embodiment, the business processes are defined using the Web Services Flow Language (OOWSFL). The business processes orchestrate a sequence of steps across multiple applications provided by the business systems 204 to achieve a business objective.

The business process controller 206 coordinates the execution of the business processes. The business process controller 206 may instantiate the forecast class and invoke functions of the resulting object in accordance with the various business processes. The business process controller 206 may also initiate the execution of business processes based on predefined conditions and events. For example, the business process controller 206 may launch a certain business process each time an alert is received. Although not shown, the business integration network may provide a standard library of business routines that may be invoked by the business processes. For example, a standard business routine may identify whether a product line and an account are related via a sales representative and create a relationship between the product line and the account if they are related. The integration server 200 may also include various tools to facilitate the development of business processes. These tools may aid in the development of transformations, the defining of classes, and the writing of process flows.

Figure 3:
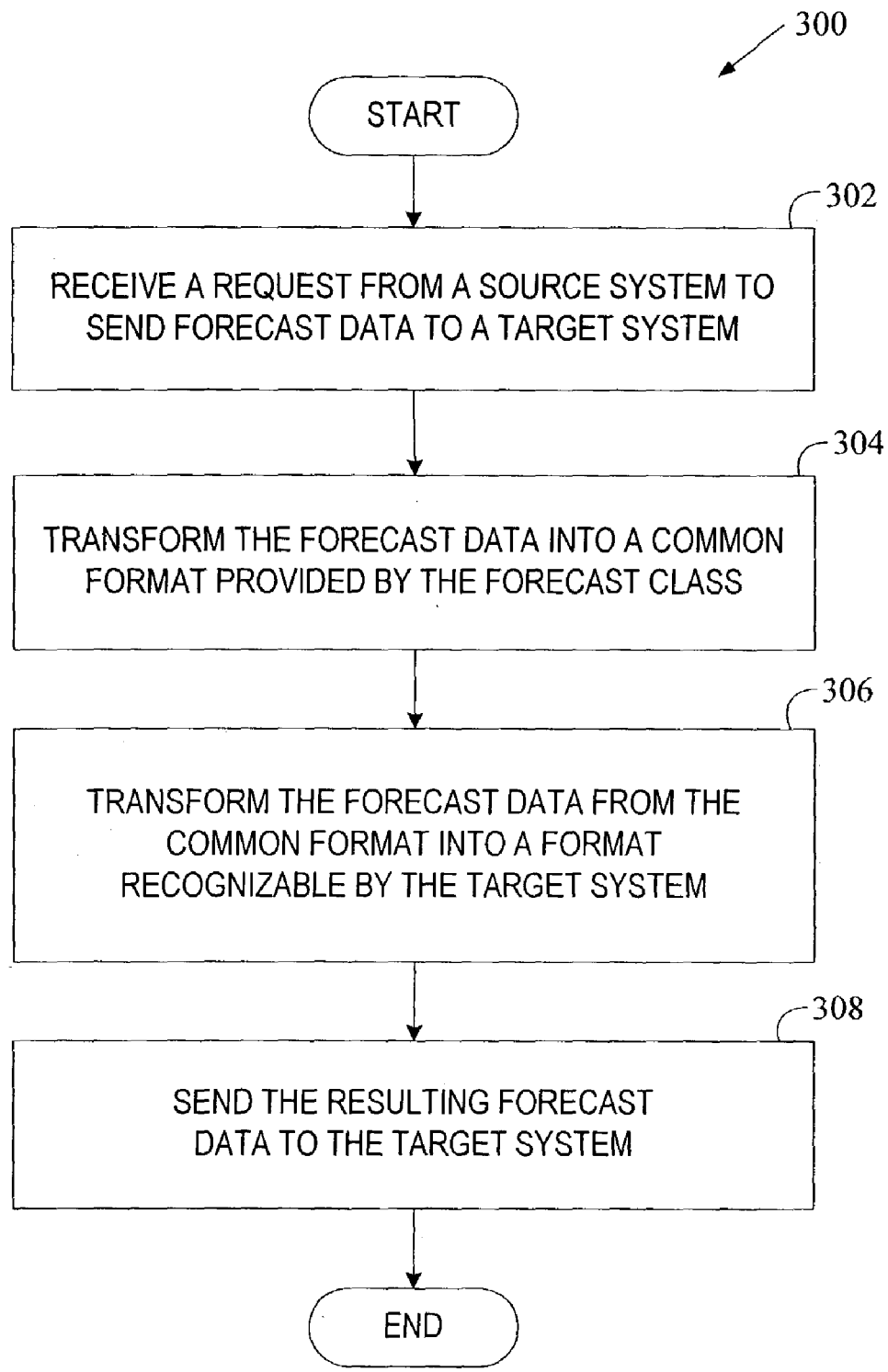
FIG. 3 is a flow diagram of one embodiment of a process for facilitating the sharing of forecast data between two applications.

FIG. 3 is a flow diagram of one embodiment of a process 300 for facilitating the sharing of forecast data between two insurance applications. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

Referring to FIG. 3, process 300 begins with processing logic receiving a request from a source system to send forecast data to a target system (processing block 302). For example, forecast data may pertain to a demand forecast created by a sales division, a source system may be a front-end application used by the sales division, and a target system may be a back-end application used by a manufacturing division to create a supply forecast based on the forecast data received from the sales division. In another example, forecast data may pertain to a supply forecast created by a manufacturing division, a source system may be a back-end application used by the manufacturing division, and a target system may be a front-end application used by a sales division to adjust their demand forecast based on the forecast data received from the manufacturing division.

Next, processing logic transforms the forecast data into a common format provided by the forecast class (processing block 304). The forecast class represents forecasts of different types (e.g., a demand forecast type and a supply forecast type) and defines relationships of a forecast with various entities related to the forecast. These entities may include, for example, a related business unit (an organization for which the forecast is created), a forecast planner (an entity creating the forecast), a related product line (a product line or service for which the forecast is created), a related product (a product or service for which the forecast is created), a related account (an organization providing the product or service for which the forecast is created), and a related sales representative (a sales representative of the product or service for which the forecast is created). In one embodiment, the forecast data model also defines relationships with demand sources for forecasts of the demand type. A demand source may be an opportunity or a service request. In one embodiment, the forecast data model associates the forecast with fact data. The fact data may include, for example, the unit price of the product or service for which the forecast is created, the total cost of the product or service for which the forecast is created, the total revenue that is expected to be generated by the product or service, the best case estimate of the revenue, and the worst case estimate of the revenue.

Further, processing logic transforms the forecast data from the common format into a format recognizable by the target system (processing block 306) and sends the resulting forecast data to the target system (processing block 308).

Thus, according to the process 300, the sharing of forecast data between two systems does not require data mapping between the data format of the source application and the data format of the target application. Instead, the mapping is performed between each system and the common data model. Furthermore, the process 300 allows various divisions and/or organizations to share the forecast data in a manner that facilitates the consolidation of their disparate forecast processes into a single, comprehensive forecast process.

An exemplary forecast process will now be described to illustrate the operation of a consolidated forecast process. In particular, a front-end forecast application may create a forecast based on revenue data provided by a customer, partner, or sales representative. Based on the forecast data model discussed herein, the revenue may have many associated dimensions, depending on the requirements of the company's forecasting methodology (e.g., the revenue data may reported by product, quantity, unit of measure, account, etc.). In addition, revenue forecasts may be created for sales representatives divisions, organizations, product lines or regions to improve management's ability to make informed business decisions via reports, charts or analysis. Executives may make revisions to the revenue forecasts and then commit the final forecast number. The revisions may be made using historical data that allows the executives to determine trends and create a reasonable projection of expected revenue. In addition, data related to the sales stage of all opportunities in the system may be evaluated to determine how close forecasted deals are to closing and to further assess pipeline coverage and the general health of the opportunity pipeline.

Further, the final forecast data may be exported to the back-end system of the manufacturing division using the process 300 discussed above. The back-end system may receive input of the supply planning team and generate a supply forecast. Then, the demand planning system of the manufacturing division may analyze the revenue forecast received from the front-end system and combine it with the supply forecast generated by the supply planning systems in order to generate the combined forecast. The combined forecast may then be transferred to the front-end system of the sales division using the process 300 discussed above.

Afterwards, the sales and operations planning meeting may be conducted, in which the executives from the sales and manufacturing divisions join together to agree upon a final product forecast, or the "consensus forecast." This forecast may then be disaggregated by the front-end system and presented to the sales division for use in incentive compensation and quota planning. In addition, the process 300 may be utilized to transfer corresponding portions of the consensus forecast to the marketing system for use in campaign and promotion planning, to the manufacturing division for use in supply planning, and to the financial division for use in budget planning and financial planning.

As discussed above, in one embodiment, each class of the forecast data model can be customized for a specific business system or application.

Figure 4:
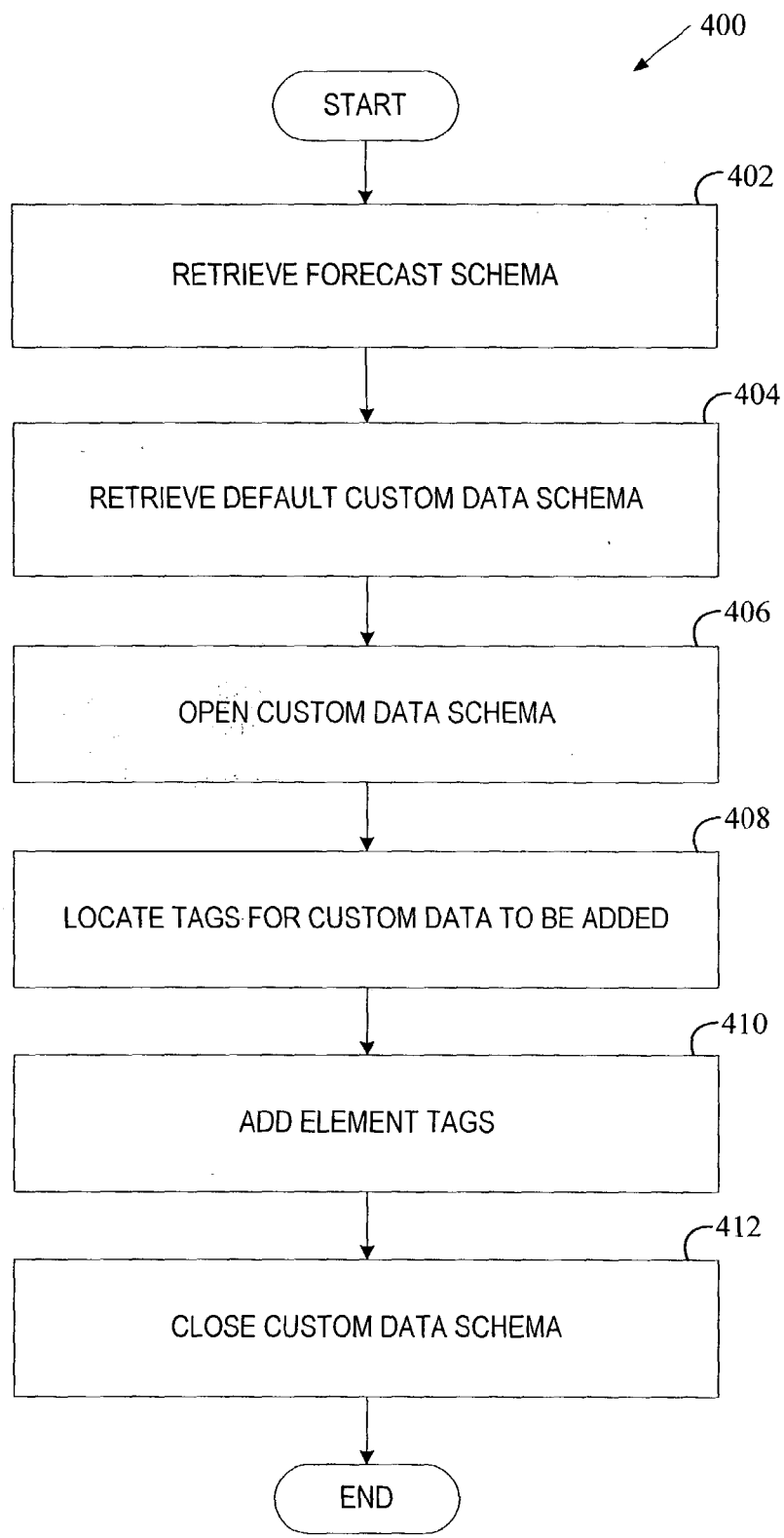
FIG. 4 is a flow diagram of one embodiment of a process for adding custom data to a forecast class.

FIG. 4 is a flow diagram of one embodiment of a process for adding custom data to forecast class. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

At processing block 402, processing logic retrieves a data definition schema for the forecast class. The schema may be an XML schema file that include a custom data element of a type that is defined in another file.

At processing block 404, processing logic retrieves the custom data schema for the types of custom data. The schema may be stored in an XML schema file that contains the definition for each type of custom data.

Next, processing logic opens the custom data schema (processing block 406) and locates the tags relating to the custom data type of interest (processing block 408).

Further, processing logic adds the custom data elements to the located tags (processing block 410) and closes the custom data schema with the newly defined data elements (processing block 412).

One embodiment of a common data model representing a forecast will now be described in more detail in conjunction with FIGS. 5-16. One skilled in the art will appreciate that various other common data models representing forecast can be used with the present invention without loss of generality. In addition, the names of data elements illustrated in FIGS. 5-16 are descriptive of the information stored in the data elements.

Figure 5:
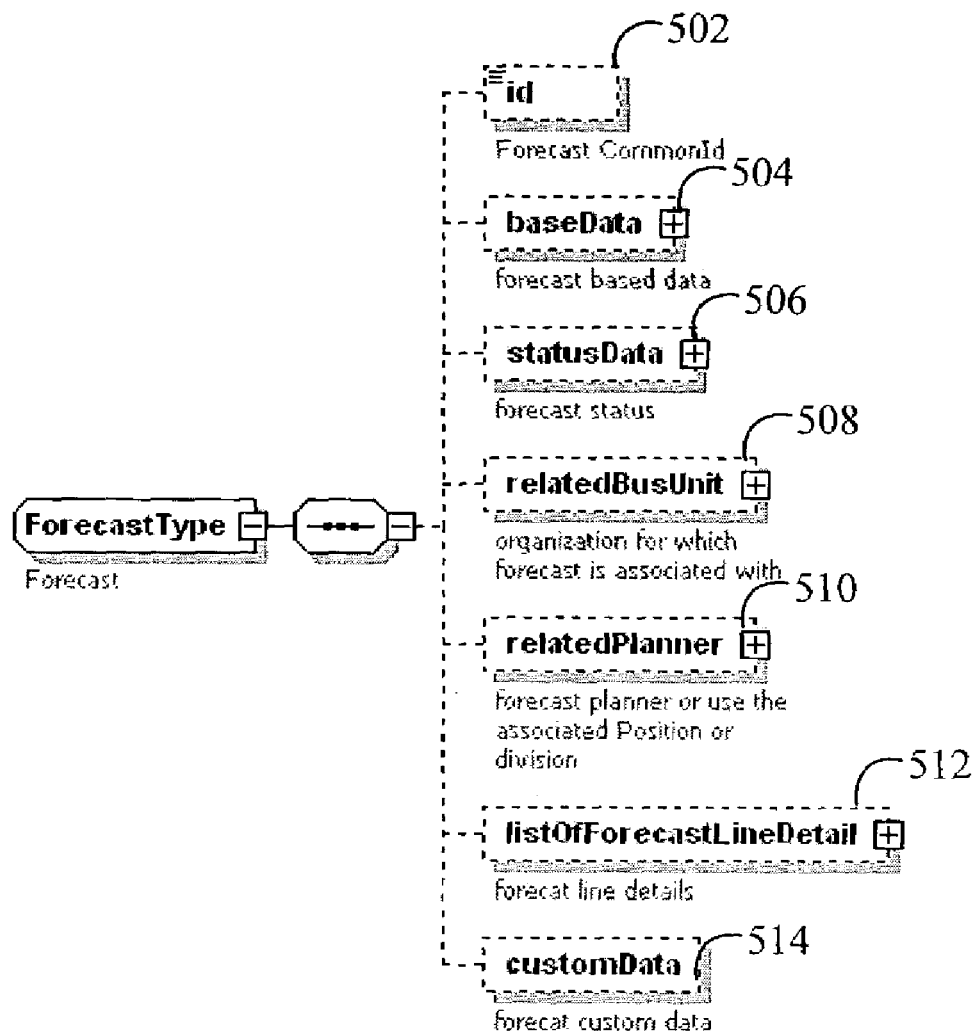
FIGS. 5-16 illustrate one embodiment of a common data model representing a forecast.

FIG. 5 illustrates the highest level data elements of the forecast class in one embodiment. The highest level data elements include id 502, baseData 504, statusData 506, relatedBusUnit 508, relatedPlanner 510, listOfForecastLineDetail 512, and customData 514.

The id data element 502 may be a unique identifier of a forecast. The baseData data element 504 contains general information about the forecast as will be discussed in greater detail below in conjunction with FIG. 6.

The statusData data element 506 contains information on the status of the forecast (e.g., in progress, archived, etc.). The relatedBusUnit data element 508 specifies an organization for which the forecast is created. The relatedPlanner data element 510 specifies an entity creating the forecast. This entity may be an employee creating the forecast or a division within which the forecast is created. The relatedPlanner data element 510 will be discussed in more detail below in conjunction with FIG. 7.

The listOfForecastLineDetail data element 512 contains detail information pertaining to a product line, a product or a service for which the forecast is created, as will be discussed in more detail below in conjunction with FIG. 8.

The customData data element 514 initially contains no data elements, but custom data elements can be added by defining data elements in the ForecastCustomDataType.

Figure 6:
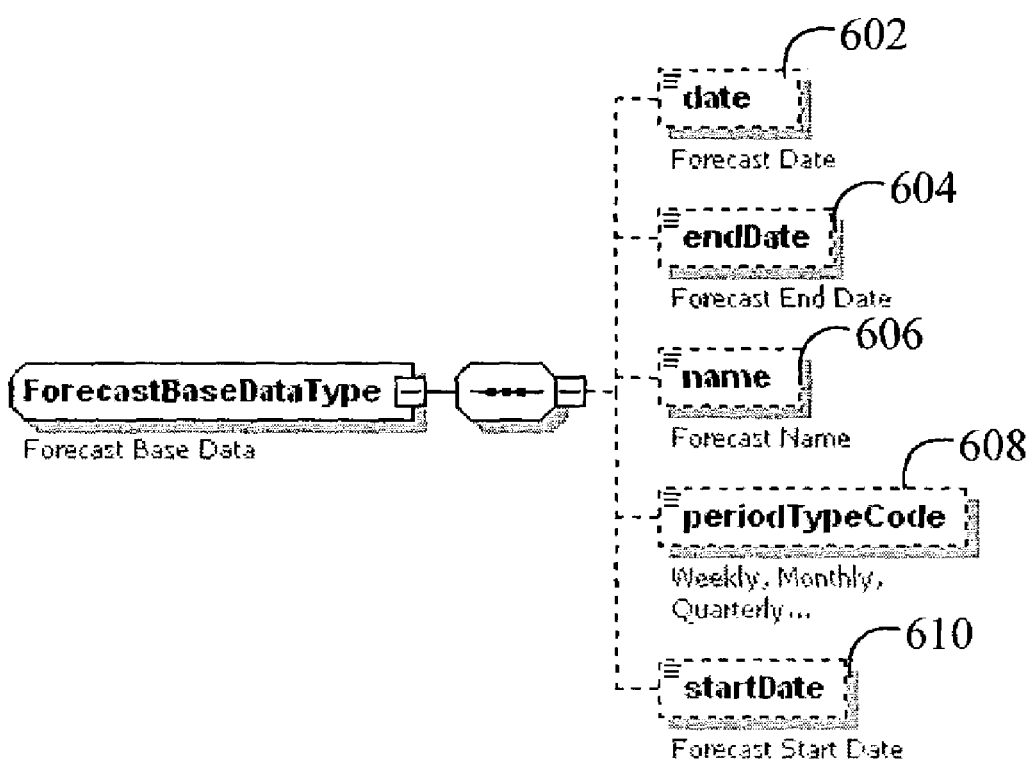

FIG. 6 illustrates the data elements of the baseData class in one embodiment. The data elements of the baseData class include date 602, endDate 604, name 606, periodTypeCode 608, and startDate 610.

The date data element 602 specifies the date for which the forecast is created (e.g., the first day of each month or week). The startDate data element 610 specifies the beginning of the date range for the forecast (i.e., the first date for which revenue records are pulled into the forecast). The endDate data element 604 defines the last date of the date range for the forecast. The name data element 606 specifies the forecast name. The periodTypeCode data element 608 defines the periodicity by which the forecast records are totaled at a summary level (e.g., weekly totals, monthly totals or quarterly totals).

Figure 7:
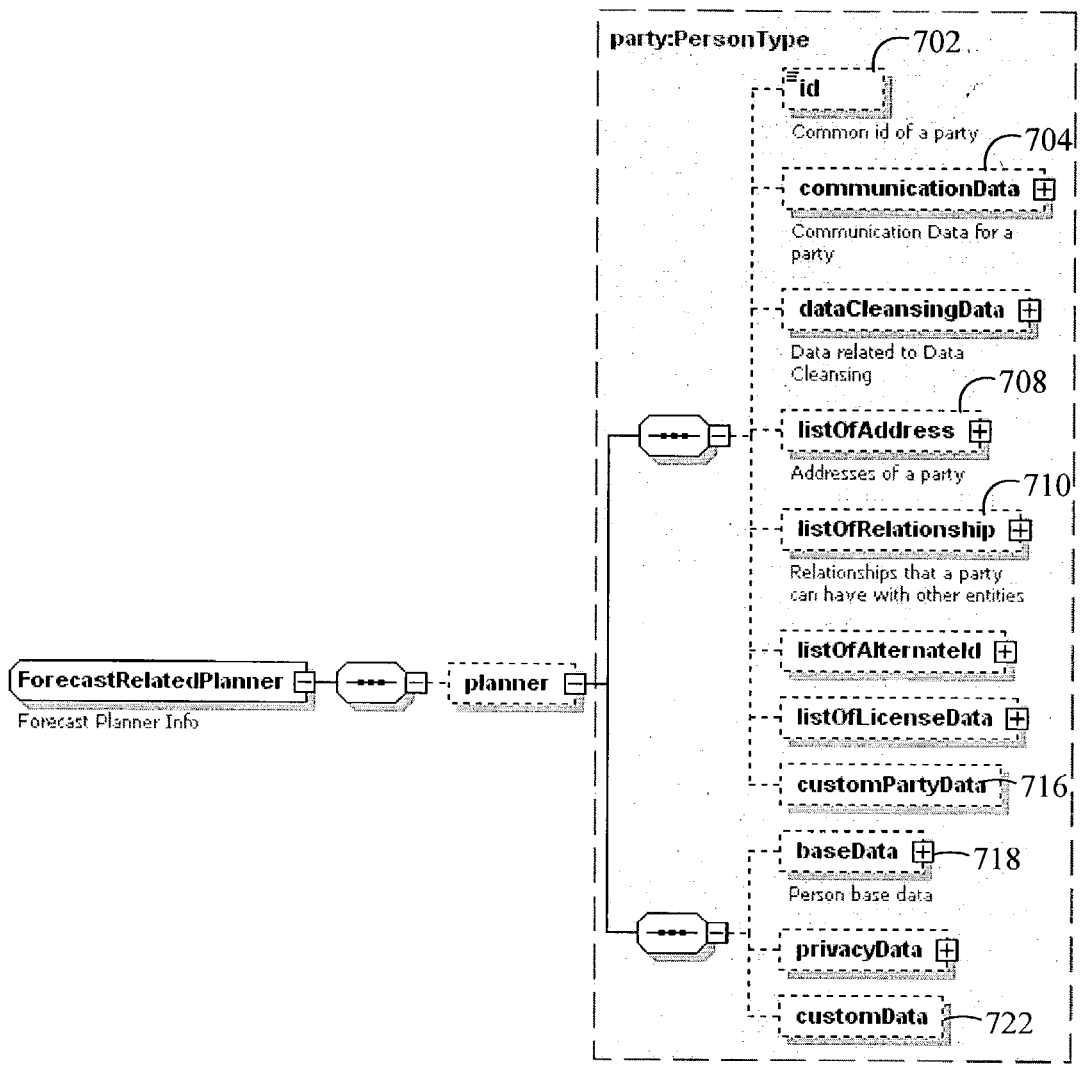

FIG. 7 illustrates the data elements of the ForecastRelatedPlanner class for the person type, according to one embodiment. The data elements used in the ForecastRelatedPlanner class include id 702 communicationData 704, listOfAddress 708, listOfRelationship 710, customPartyData 716, baseData 718, and customData 722.

The id data element 702 may be a unique identifier of a party. The communicationData data element 704 contains general information on the communication data for a party. The listOfAddress data element 708 contains the addresses of a party. The listOfRelationship data element 710 defines relationships that a party can have with other entities. The customPartyData data element 716 initially contains no data elements, but custom data elements can be added by defining data elements in the PartyCustomData Type. The baseData data element 718 contains general information about the person.

Figure 8:
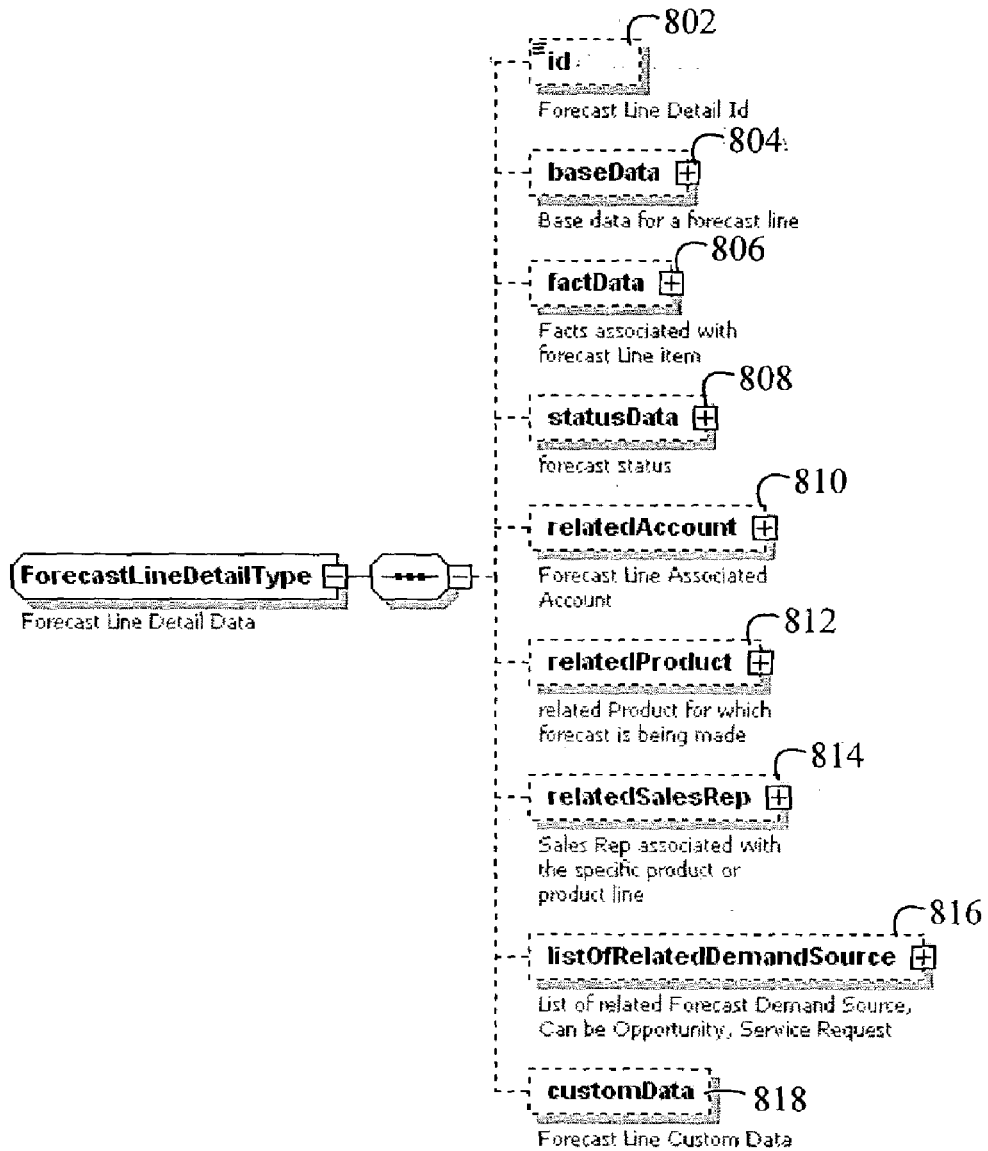

FIG. 8 illustrates the data elements of the ForecastLineDetailType class in one embodiment. The ForecastLineDetailType class provides detailed information on a product, product line or service for which the forecast is created. In the following description of the data elements of the ForecastLineDetailType class, a product, a product line and a service are collectively referred to as a product. The data elements of the ForecastLineDetailType class include id 802, baseData 804, factData 806, statusData 808, relatedAccount 810, relatedProduct 812, relatedSalesRep 814, listOfRelatedDemandSource 816 and custom data 818. In one embodiment, the listOfRelatedDemandSource data element 816 is used to indicate whether the other data elements contain data of a demand forecast or supply forecast. In one embodiment, if the listOfRelatedDemandSource data element 816 contains no data, the other data elements are considered to store data of the demand forecast. Otherwise, the data elements will be considered to store data of the supply forecast.

The id data element 802 may contain a unique identifier of a product for which the forecast is created. The baseData data element 804 specifies general information for the product as will be discussed in more detail below in conjunction with FIG. 9. The factData data element 806 specifies facts associated with the product or product line as will be discussed in more detail below in conjunction with FIG. 10. The statusData data element 808 indicates the status of the forecast line. The relatedAccount data element 810 contains information about an organization providing the product as will be discussed in more detail below in conjunction with FIG. 11. The relatedProduct data element 812 contains information about the product as will be discussed in more detail below in conjunction with FIG. 12. The relatedSalesRep data element 814 contains information about a sales representative associated with the product as will be discussed in more detail below in conjunction with FIG. 13. The listOfRelatedDemandSource data element 816 identifies sources of the demand for the product as will be discussed in more detail below in conjunction with FIGS. 14-16. The customData data element 818 initially contains no data elements, but custom data elements can be added by defining data elements in the ForecastLineCustomData Type.

Figure 9:
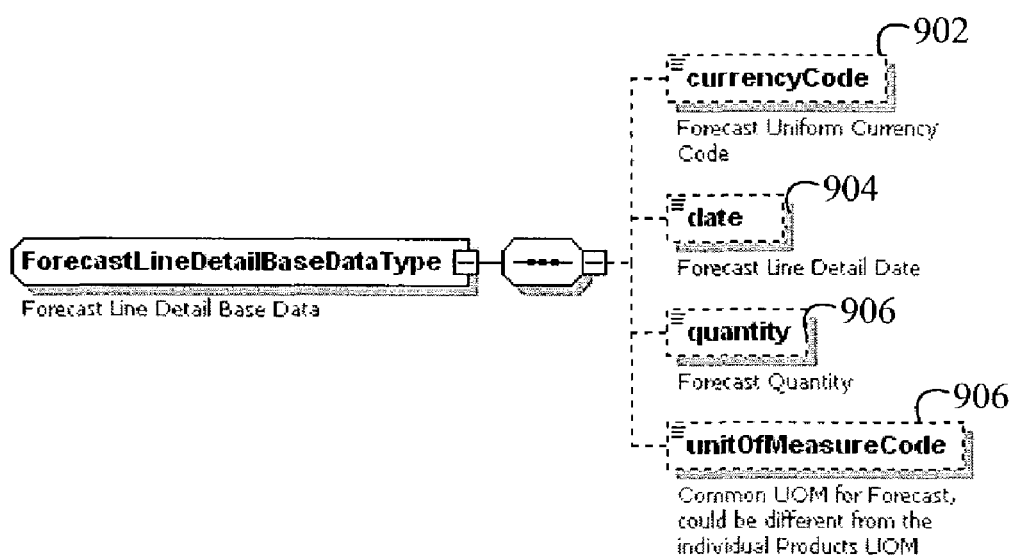

FIG. 9 illustrates the data elements of the ForecastLineDetailBaseDataType class in one embodiment. These data elements include the currencyCode 902, the date 904, the quantity 906, and the unitOfMeasureCode 908.

The currencyCode data element 902 specifies a forecast uniform currency code. The date 904 data element indicates the date for which the forecast associated with this product is created. The quantity data element 906 defines the quantity of the product. The unitOfMeasureCode data element 908 specifies the unit of measure for the product quantity (e.g., a uniform unit of measure or a detail unit of measure).

Figure 10:
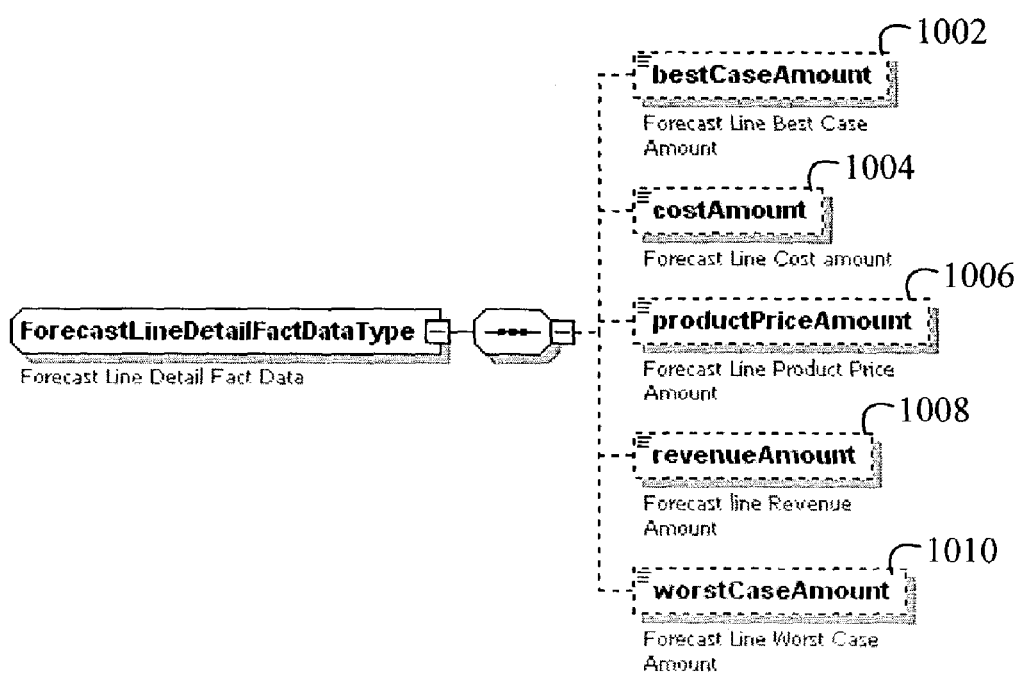

FIG. 10 illustrates the data elements of the ForecastLineDetailFactDataType class in one embodiment. These data elements include bestCaseAmount 1002, costAmount 1004, productPriceAmount 1006, revenueAmount 1008, and worstCaseAmount 1010.

The revenueAmount data element 1008 specifies the total revenue that is expected to be generated by the product. The bestCaseAmount data element 1002 specifies the best case estimate of the revenue. The costAmount data element 1004 specifies the total cost of the product. The productPriceAmount data element 1006 specifies the unit price of the product. The worstCaseAmount data element 1010 specifies the worst case estimate of the revenue.

Figure 11:
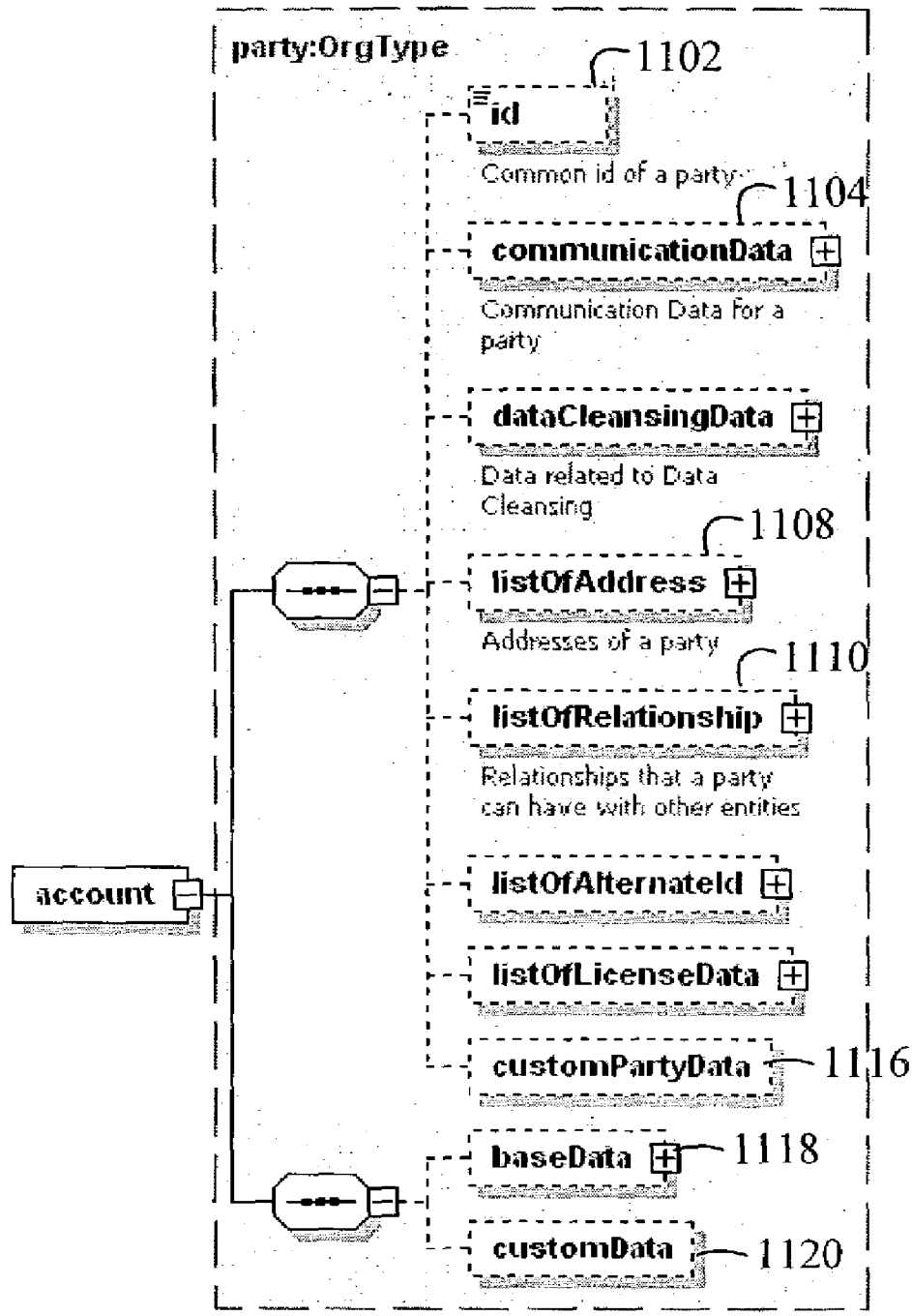

FIG. 11 illustrates the data elements of the RelatedAccount class in one embodiment. The data elements used in the RelatedAccount class include id 1102, communicationData 1104, listOfAddress 1108, listOfRelationship 1110, customPartyData 1116, baseData 1118, and customData 1120.

Figure 12:
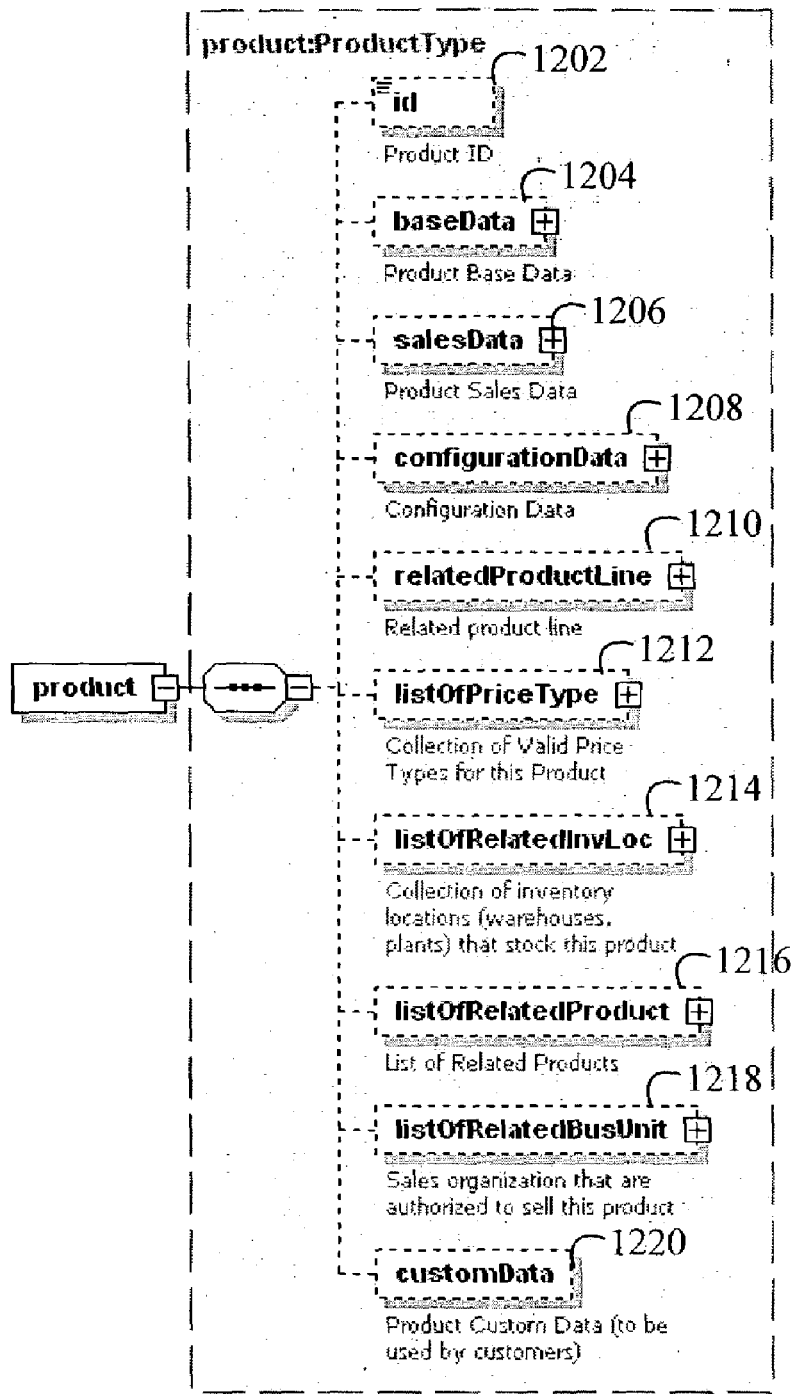

FIG. 12 illustrates the data elements of the RelatedProduct class in one embodiment. These data elements include id. 1202, baseData 1204, salesData 1206, configurationData 1208, relatedProductLine 1210, listOfPriceType 1212, listOfRelatedInvLoc 1214, listOfRelatedProduct 1216, listOfRelatedBusUnit 1218, and customData 1220.

The id data element 1202 specific a unique identifier of the product. The baseData data element 1204 contains general information about the product. The salesData data element 1206 contains information pertaining to product sales. The configurationData data element 1208 contains information on product configuration. The relatedProductLine data element 1210 specifies the related product line. The listOfPriceType data element 1212 defines the collection of valid price types for this product. The listOfRelatedInvLoc data element 1214 defines a collection of inventory locations that stock this product. The locations may include warehouses or plants. The listOfRelatedProduct data element 1216 defines the list of related products. The listOfRelatedBusUnit data element 1218 contains information on organizations that are authorized to sell this product.

Figure 13:
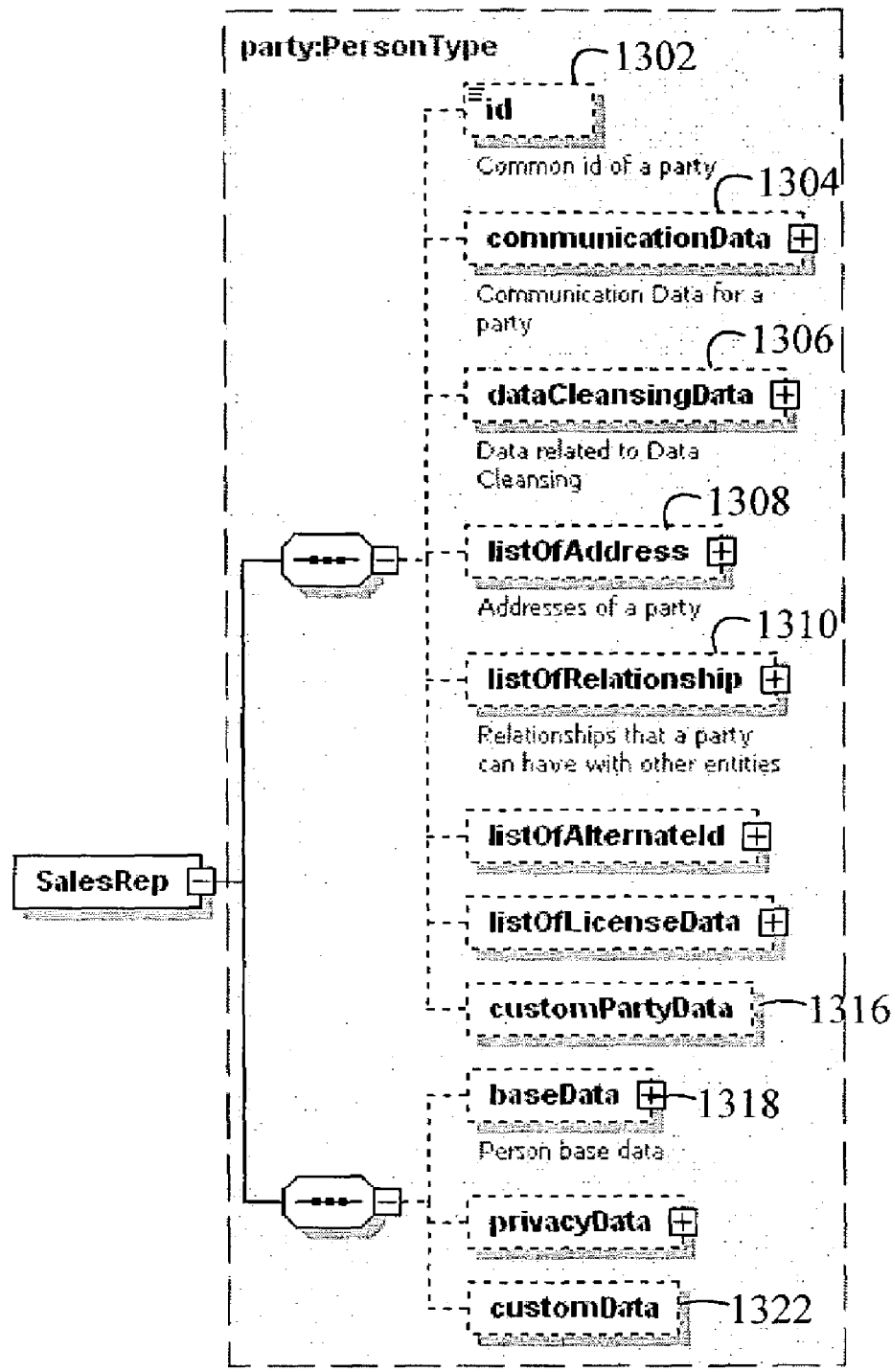

FIG. 13 illustrates the data elements of the RelatedSalesRep class for the person type, according to one embodiment. The data elements used in the RelatedSalesRepresentative class include id 1302, communicationData 1304, listOfAddress 1308, listOfRelationship 1310customPartyData 1316, baseData 1318, and customData 1322.

Figure 14:
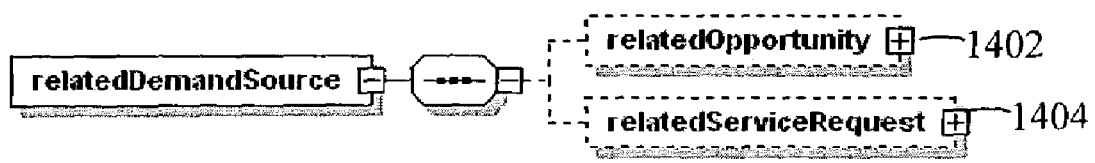

FIG. 14 illustrates the data elements of the relatedDemandSource class in one embodiment. These data elements include relatedOpportunity 1502 and relatedServiceRequest 1504. The relatedOpportunity data element 1502 contains information on a business opportunity for which the forecast is created, as will be discussed in more detail below in conjunction with FIG. 15. The relatedServiceRequest data element 1504 contains information on a service request for which the forecast is created, as will be discussed in more detail below in conjunction with FIG. 16.

Figure 15:
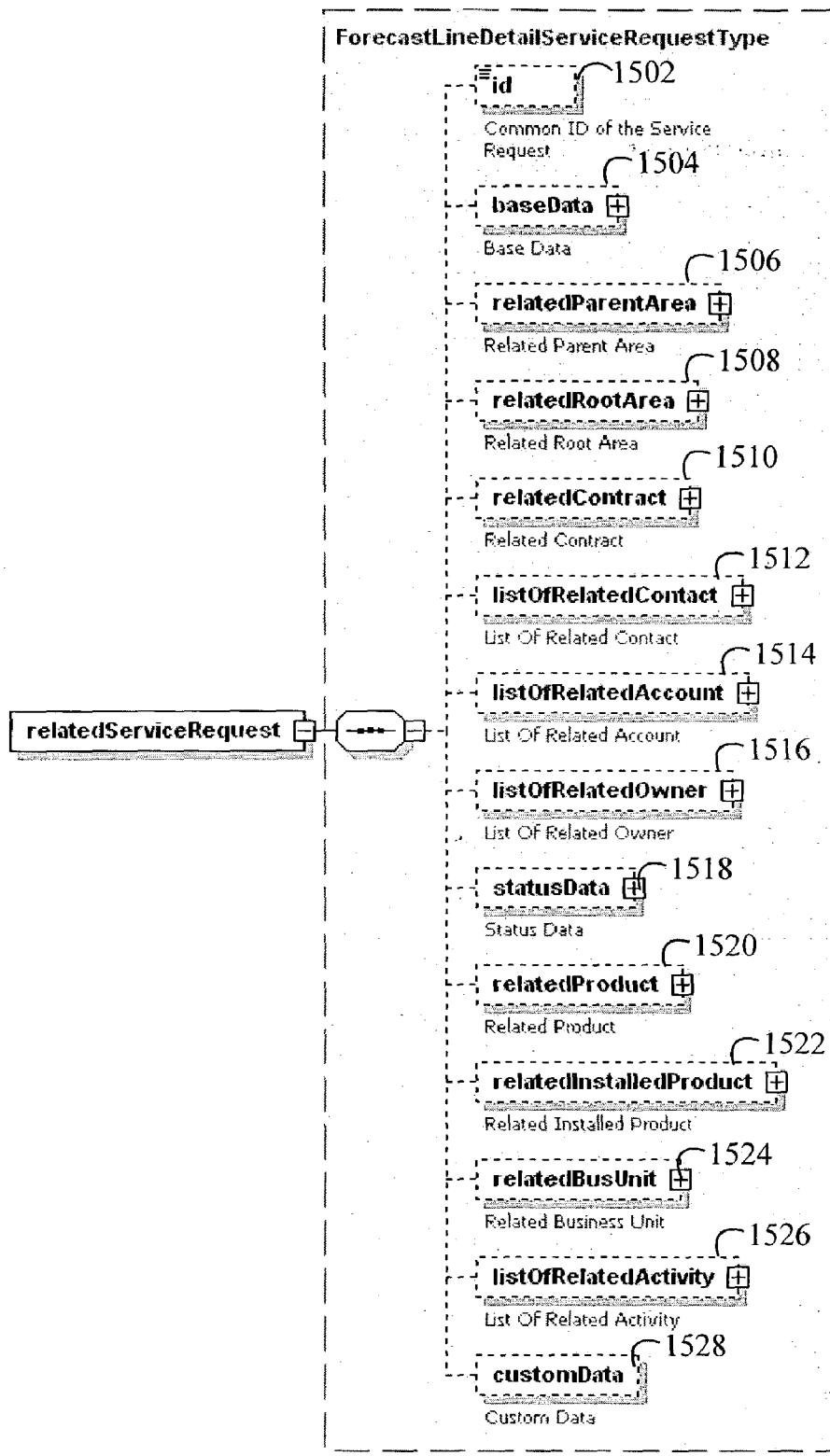

FIG. 15 illustrates the data elements of the relatedServiceRequest class in one embodiment. These data elements include id 1502, baseData 1504, relatedParentArea 1506, relatedRootArea 1508, relatedContract 1510, listOfRelatedContract 1512, listOfRelatedAccount 1514, listOfRelatedOwner 1516, statusData 1518, relatedProduct 1520, relatedInstalledProduct 1522, relatedBusUnit 1524, listOfRelatedActivity 1526, and customData 1528.

The id data element 1502 may contain a unique identifier of the service request. The baseData data element 1504 contains general information on the service request. The relatedParentArea data element 1506 contains information about the area that triggered the creation of the service request. The relatedRootArea data element 1508 identifies the area of the service. The relatedContract data element 1510 identifies the contract for the performance of the service. The listOfRelatedContract data element 1512 identifies a list of related contracts. The listOfRelatedAccount data element 1514 contains information on the list of related accounts. The listOfRelatedOwner data element 1516 contains information on the list of owners of the service request. The statusData data element 1518 defines the status of the service request. The relatedProduct data element 1520 contains information on the related product. The relatedInstalledProduct data element 1522 contains information on the related installed product. The relatedBusUnit data element 1524 identifies a related business unit. The listOfRelatedActivity data element 1526 contains information on the list of related activities. The customData data element 1528 initially contains no data elements, but custom data elements can be added by defining data elements in the ServiceRequestCustomData Type.

Figure 16:
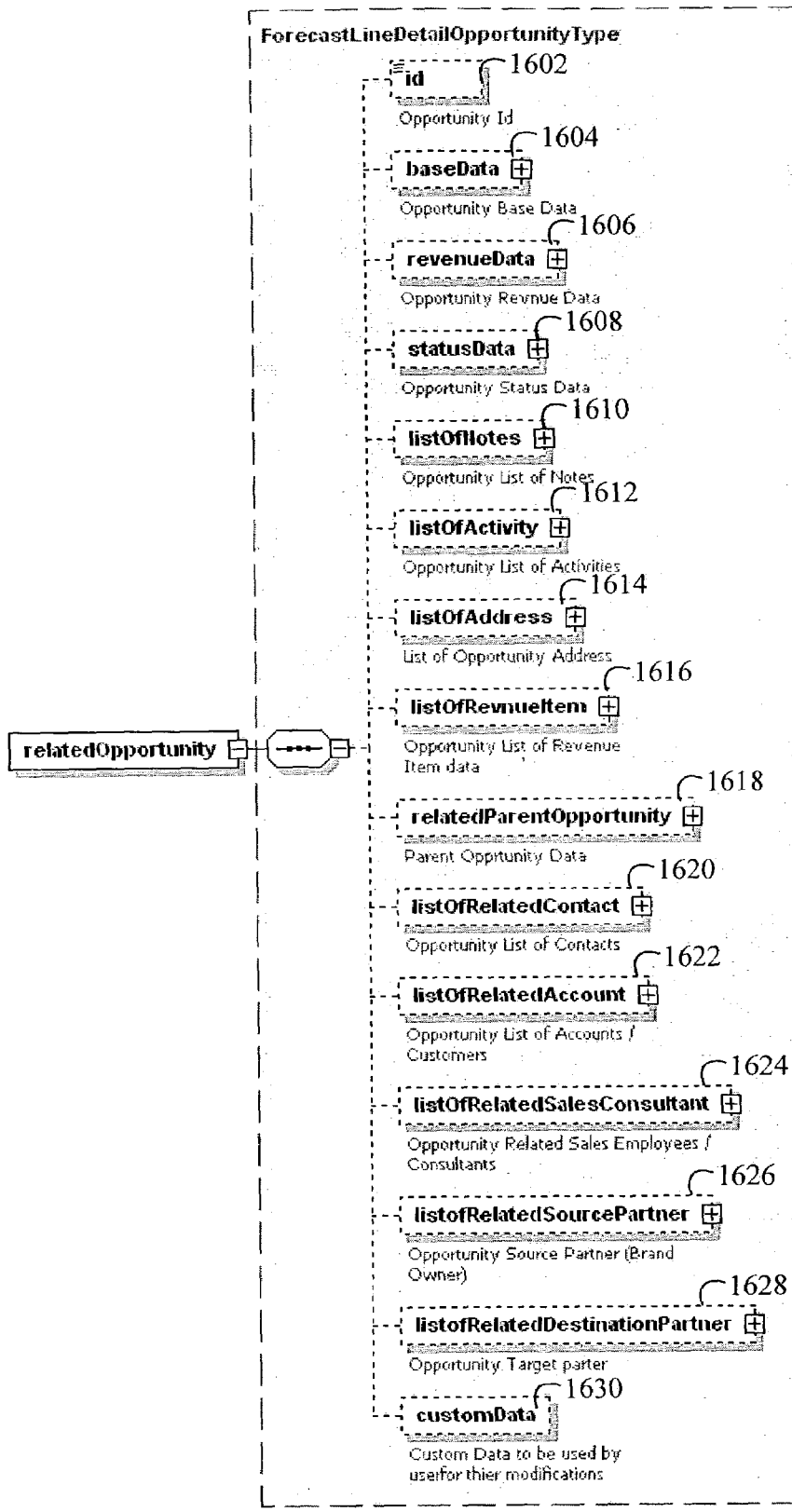

FIG. 16 illustrates the data elements of the relatedOpportunity class in one embodiment. These data elements include id 1602, baseData 1604, revenueData 1606, statusData 1608, listOfNotes 1610, listOfActivity 1612, listOfAddress 1614, listOfRevenueItem 1616, relatedParent Opportunity 1618, listOfRelatedContact 1620, listOfRelatedAcount 1622, listOfRelatedSalesConsultant 1624, listOfRelatedSourcePartner 1626, listOfRelatedDestinationPartner 1628, and customData 1630.

The id data element 1602 may contain a unique identifier of the opportunity. The baseData data element 1604 contains general information on the opportunity. The revenueData data element 1606 defines the revenue associated with the opportunity. The statusData data element 1608 contains information on the status of the opportunity. The listOfNotes data element 1610 specifies notes associated with the opportunity. The listOfActivity data element 1612 specifies activities associated with the opportunity. The listOfAddress data element 1614 specifies the list of addresses associated with the opportunity. The listOfRevenueItem data element 1616 identifies the list of revenue items associated with the opportunity. The relatedParent Opportunity data element 1618 contains information on the parent opportunity. The listOfRelatedContact data element 1620 contains information on the contacts associated with the opportunity. The listOfRelatedAcount data element 1622 identifies accounts (producers and customers) associated with the opportunity. The listOfRelatedSalesConsultant data element 1624 contains information on the sales employees and consultants related to the opportunity. The listOfRelatedSourcePartner data element 1626 contains information on the opportunity source partner or brand owner. The listOfRelatedDestinationPartner data element 1628 contains information on the opportunity target partner. The customData data element 1630 initially contains no data elements, but custom data elements can be added by defining data elements in the OpportunityCustomData Type.

Figure 17:
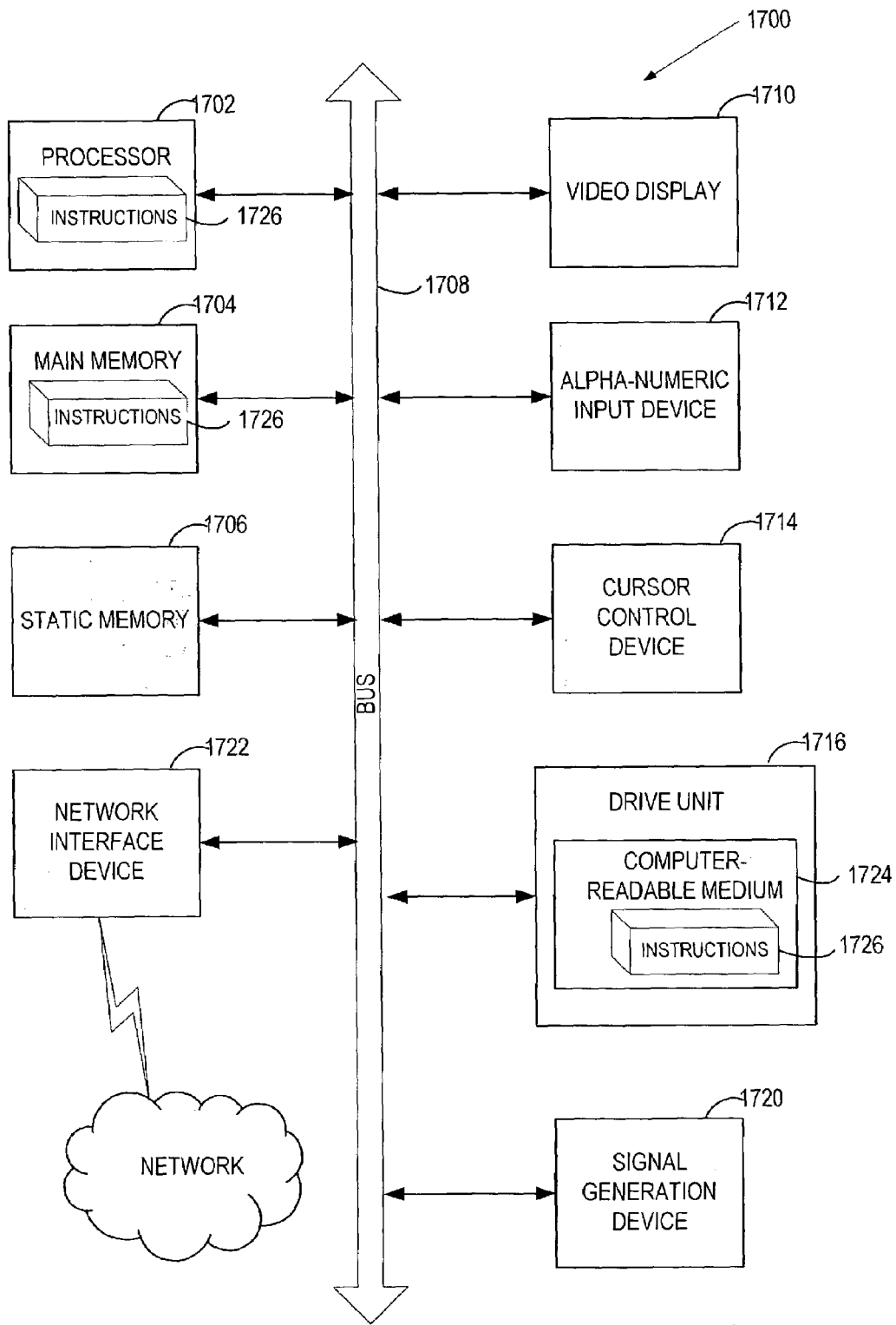
FIG. 17 is a block diagram of an exemplary computer system that may be used to perform one or more of the operations described herein.

FIG. 17 is a block diagram of an exemplary computer system 1700 (e.g., of the integration server 200 of FIG. 2) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1700 includes a processor 1702, a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alpha-numeric input device 1712 (e.g., a keyboard), a cursor control device 1714 (e.g., a mouse), a disk drive unit 1716, a signal generation device 1720 (e.g., a speaker) and a network interface device 1722.

The disk drive unit 1716 includes a computer-readable medium 1724 on which is stored a set of instructions (i.e., software) 1726 embodying any one, or all, of the methodologies described above. The software 1726 is also shown to reside, completely or at least partially, within the main memory 1704 and/or within the processor 1702. The software 1726 may further be transmitted or received via the network interface device 1722. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer-implemented method comprising:
defining a forecast class that represents forecasts of different types, wherein
the forecast class identifies a set of relationships of a forecast with a plurality of entities related to the forecast,
the different forecast types comprise a demand forecast type and a supply forecast type, and
the forecast class includes a designated data element to store data indicating whether data elements of the forecast class store data of a demand forecast; and
representing the forecasts provided by the forecast class in a common format.

2. The method of claim 1 further comprising:
determining that the forecast data pertains to a forecast of a supply type; and
setting the designated data element of the forecast class to indicate that data elements of the forecast class store data of a supply forecast.

3. The method of claim 1 wherein the plurality of entities related to the forecast includes entities selected from the group consisting of a related business unit, a forecast planner, a related account, a related product, a related sales representative, a related demand source, and related fact data.

4. The method of claim 3 wherein the related demand source is any one of a related demand source and a related opportunity.

5. The method of claim 3 wherein the related fact data includes data items selected from the group consisting of a forecast best case amount, a forecast worst case amount, a forecast cost amount, a forecast product price amount, and a forecast revenue amount.

6. The method of claim 1 wherein the forecast class includes a custom data element for defining one or more custom data fields for the forecast class.

7. The method of claim 6 wherein the one or more custom data fields of the forecast class are specific to an application.

8. The method of claim 1 further comprising:
instantiating the forecast class; and
initializing data elements of the instantiated forecast class.

9. The method of claim 8 further comprising:
transforming data received from a source application into a common format of the forecast class;
transforming the data from the common format into a target format of a target application; and
sending the data in the target format to the target application.

10. The method of claim 1 wherein a definition of the forecast class is represented as an XML schema.

11. The method of claim 1 further comprising:
transforming the forecast into a first transformed forecast in the common format provided by the forecast class; and
transforming the first transformed forecast into a second transformed forecast in a format recognizable by a target system.

12. A computer-implemented method for data transformation, the method comprising:
receiving forecast data from a source application; and
transforming the forecast data into a common format provided by a forecast class, wherein
the forecast class represents forecasts of different types,
the forecast class identifies a set of relationships of a forecast with a plurality of entities related to the forecast,
the forecast class includes a designated data element to store data indicating whether data elements of the forecast class store data of a demand forecast, and
the different forecast types comprise a demand forecast type and a supply forecast type.

13. The method of claim 12 further comprising:
determining that the forecast data received from the source application pertains to a forecast of a supply type; and
setting the designated data element of the forecast class to indicate that data elements of the forecast class store data of a supply forecast.

14. The method of claim 12 wherein the plurality of entities related to the forecast includes entities selected from the group consisting of a related business unit, a forecast planner, a related account, a related product, a related sales representative, a related demand source, and related fact data.

15. The method of claim 14 wherein the related demand source is any one of a related demand source and a related opportunity.

16. The method of claim 15 wherein the related fact data includes data items selected from the group consisting of a forecast best case amount, a forecast worst case amount, a forecast cost amount, a forecast product price amount, and a forecast revenue amount.

17. The method of claim 12 wherein the forecast class includes a custom data element for defining one or more custom data fields for the forecast class.

18. The method of claim 12 wherein a first transformed data comprises the forecast data transformed into the common format, the method further comprising:
transforming the first transformed data into a second transformed data in a format recognizable by a target system.

19. A computer-readable medium having executable instructions to cause a computer to perform a method comprising:
defining a forecast class that represents forecasts of different types, wherein
the forecast class identifies a set of relationships of a forecast with a plurality of entities related to the forecast,
the different forecast types comprise a demand forecast type and a supply forecast type, and
the forecast class includes a designated data element to store data indicating whether data elements of the forecast class store data of a demand forecast; and
representing the forecasts provided by the forecast class in a common format.

20. The computer readable medium of claim 19 wherein the method further comprises:
determining that the forecast data pertains to a forecast of a supply type; and
setting the designated data element of the forecast class to indicate that data elements of the forecast class store data of a supply forecast.

21. The computer readable medium of claim 19 wherein the plurality of entities related to the forecast includes entities selected from the group consisting of a related business unit, a forecast planner, a related account, a related product, a related sales representative, a related demand source, and related fact data.

22. The computer readable medium of claim 19 wherein the forecast class includes a custom data element for defining one or more custom data fields for the forecast class.

23. The computer readable medium of claim 19 wherein a definition of the forecast class is represented as an XML schema.

24. The computer readable medium of claim 19 wherein the method further comprises:
transforming the forecast into a first transformed forecast in the common format provided by the forecast class; and
transforming the first transformed forecast into a second transformed forecast in a format recognizable by a target system.

25. A computer readable medium having executable instructions to cause a computer to perform a method comprising:
receiving forecast data from a source application; and
transforming the forecast data into a common format provided by a forecast class, wherein
the forecast class represents forecasts of different types,
the forecast class identifies a set of relationships of a forecast with a plurality of entities related to the forecast,
the forecast class includes a designated data element to store data indicating whether data elements of the forecast class store data of a demand forecast, and
the different forecast types comprise a demand forecast type and a supply forecast type.

26. The computer readable medium of claim 25 wherein the plurality of entities related to the forecast includes entities selected from the group consisting of a related business unit, a forecast planner, a related account, a related product, a related sales representative, a related demand source, and related fact data.

27. The computer readable medium of claim 25 wherein the forecast class includes a custom data element for defining one or more custom data fields for the forecast class.

28. The computer readable medium of claim 25 wherein a first transformed data comprises the forecast data transformed into the common format, and the method further comprises:
   transforming the first transformed data into a second transformed data in a format recognizable by a target system.

29. A system comprising:
   a memory; and
   at least one processor coupled to the memory, the processor executing a set of instructions which cause the processor to define a forecast class that represents forecasts of different types, wherein
      the forecast class identifies a set of relationships of a forecast with a plurality of entities related to the forecast,
      the different forecast types comprise a demand forecast type and a supply forecast type, and
      the forecast class includes a designated data element to store data indicating whether data elements of the forecast class store data of a demand forecast; and
   represent the forecasts provided by the forecast class in a common format.

30. The system of claim 29 wherein the plurality of entities related to the forecast includes entities selected from the group consisting of a related business unit, a forecast planner, a related account, a related product, a related sales representative, a related demand source, and related fact data.

31. The system of claim 29 wherein the instructions further cause the processor to:
   transform the forecast into a first transformed forecast in the common format provided by the forecast class; and
   transform the first transformed forecast into a second transformed forecast in a format recognizable by a target system.

32. A system comprising:
   a memory; and
   at least one processor coupled to the memory, the processor executing a set of instructions which cause the processor to
      receive forecast data from a source application, and
      transform the forecast data into a common format provided by a forecast class, wherein
         the forecast class represents forecasts of different types,
         the forecast class identifies a set of relationships of a forecast with a plurality of entities related to the forecast,
         the forecast class includes a designated data element to store data indicating whether data elements of the forecast class store data of a demand forecast, and
         the different forecast types comprise a demand forecast type and a supply forecast type.

33. The system of claim 32 wherein the plurality of entities related to the forecast includes entities selected from the group consisting of a related business unit, a forecast planner, a related account, a related product, a related sales representative, a related demand source, and related fact data.

34. The system of claim 32 wherein a first transformed data comprises the forecast data transformed into the common format, and the instructions further cause the processor to:
   transform the first transformed data into a second transformed data in a format recognizable by a target system.

35. An apparatus comprising:
   means for defining a forecast class that represents forecasts of different types, wherein
      the forecast class identifies a set of relationships of a forecast with a plurality of entities related to the forecast,
      the different forecast types comprise a demand forecast type and a supply forecast type, and
      the forecast class includes a designated data element to store data indicating whether data elements of the forecast class store data of a demand forecast; and
   means for representing the forecasts provided by the forecast class in a common format.

36. The apparatus of claim 35 further comprising:
   means for transforming the forecast into a first transformed forecast in the common format provided by the forecast class; and
   means for transforming the first transformed forecast into a second transformed forecast in a format recognizable by a target system.

37. An apparatus for data transformation, the apparatus comprising:
   means for receiving forecast data from a source application; and
   means for transforming the forecast data into a common format provided by a forecast class, wherein
      the forecast class represents forecasts of different types,
      the forecast class identifies a set of relationships of a forecast with a plurality of entities related to the forecast,
      the forecast class includes a designated data element to store data indicating whether data elements of the forecast class store data of a demand forecast, and
      the different forecast types comprise a demand forecast type and a supply forecast type.

38. The apparatus of claim 37 wherein a first transformed data comprises the forecast data transformed into the common format, the apparatus further comprising:
   means for transforming the first transformed data into a second transformed data in a format recognizable by a target system.

* * * * *

UNITED STATES PATENT AND TRADEMARK OFFICE
CERTIFICATE OF CORRECTION

| | | |
|---|---|---|
| PATENT NO. | : 7,606,699 B2 | Page 1 of 1 |
| APPLICATION NO. | : 10/397681 | |
| DATED | : October 20, 2009 | |
| INVENTOR(S) | : Ramaswamy Sundararajan et al. | |

It is certified that error appears in the above-identified patent and that said Letters Patent is hereby corrected as shown below:

On the title page, should read (*) Notice: Subject to any disclaimers, the term of this patent is extended or adjusted under 35 U.S.C. 154 (b) by 727 days.

On Drawing sheet 5 of 17, in Figure 5, below Ref. Numeral 512, line 2, delete "forecat" and insert -- forecast --, therefor.

On Drawing sheet 5 of 17, in Figure 5, below Ref. Numeral 514, line 2, delete "forecat" and insert -- forecast --, therefor.

On Drawing sheet 16 of 17, in Figure 16, below Ref. Numeral 1630, line 2, delete "userfor" and insert -- user for --, therefor.

In column 1, line 60-63, delete "Unfortunately,.................information." and insert the same after "company." on Col. 1, Line 58, as a continuation of the same paragraph.

In column 7, line 23, after "representatives" insert -- , --.

In column 10, line 20, delete "id." and insert -- id --, therefor.

In column 10, line 44, delete "1310customPartyData" and insert -- 1310, customPartyData --, therefor.

Signed and Sealed this

Seventeenth Day of August, 2010

David J. Kappos
*Director of the United States Patent and Trademark Office*